United States Patent [19]

Ball et al.

[11] Patent Number: 5,290,135
[45] Date of Patent: Mar. 1, 1994

[54] ROTARY RING CUTTER HAVING COOLANT DISTRIBUTION AND DISCHARGE MEANS

[75] Inventors: Robert J. Ball, Plymouth, England; Richard C. Blakesley, Holcomb, N.Y.

[73] Assignee: The Gleason Works, Rochester, N.Y.

[21] Appl. No.: 967,362

[22] Filed: Oct. 28, 1992

[51] Int. Cl.⁵ ............................................. B23P 15/28
[52] U.S. Cl. ................................... 407/11; 407/21; 409/136
[58] Field of Search .................... 409/27–29, 409/63, 136; 407/11, 21; 51/267, 356

[56] References Cited

U.S. PATENT DOCUMENTS

| | | | |
|---|---|---|---|
| 1,679,809 | 8/1928 | Bullock et al. | |
| 2,080,401 | 5/1937 | Heard. | |
| 2,842,908 | 7/1958 | Allison | 51/267 |
| 3,176,675 | 4/1965 | Bomba. | |
| 3,777,443 | 12/1973 | Shaw. | |
| 3,877,176 | 4/1975 | Kotthaus. | |
| 4,414,783 | 11/1983 | Vincent. | |
| 4,528,779 | 7/1985 | Wiener. | |
| 4,625,707 | 12/1986 | Whittaker. | |
| 4,870,846 | 10/1989 | Long et al. | 51/267 |
| 4,890,963 | 1/1990 | Keritsis | 409/136 |
| 4,951,426 | 8/1990 | Kurono et al. | |
| 5,094,039 | 3/1992 | Yoshioka. | |
| 5,137,402 | 8/1992 | Ball et al. | |
| 5,140,780 | 8/1992 | Lincoln. | |

FOREIGN PATENT DOCUMENTS

| | | |
|---|---|---|
| 483561 | 5/1992 | European Pat. Off. . |
| 516543 | 1/1931 | Fed. Rep. of Germany . |
| 63-16921 | 1/1988 | Japan . |
| 9206817 | 4/1992 | PCT Int'l Appl. . |
| 696198 | of 1953 | United Kingdom . |

*Primary Examiner*—Mark Rosenbaum
*Assistant Examiner*—Kenneth J. Hansen
*Attorney, Agent, or Firm*—Robert L. McDowell; Ralph E. Harper

[57] ABSTRACT

A face mill type cutter, preferably a rotary ring cutter, having coolant passages located within the cutter to supply coolant to discharge outlets located between and/or in the stock removing surfaces located on the cutter. Coolant is supplied to the face mill cutter either by a coolant shroud arranged about at least a portion of the periphery of the cutter, or, by at least one coolant delivery passage arranged in the spindle of a machine tool.

39 Claims, 10 Drawing Sheets

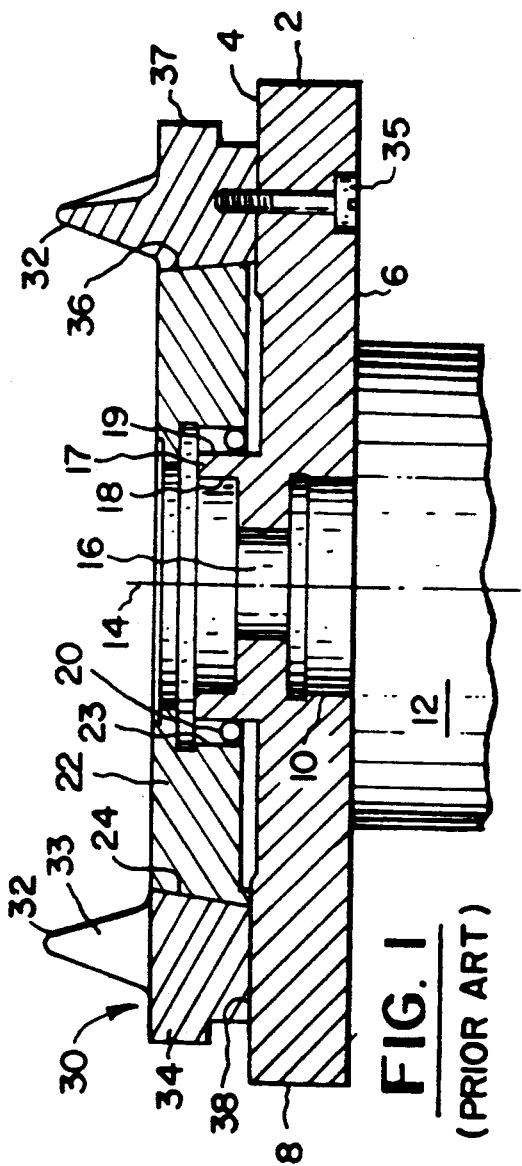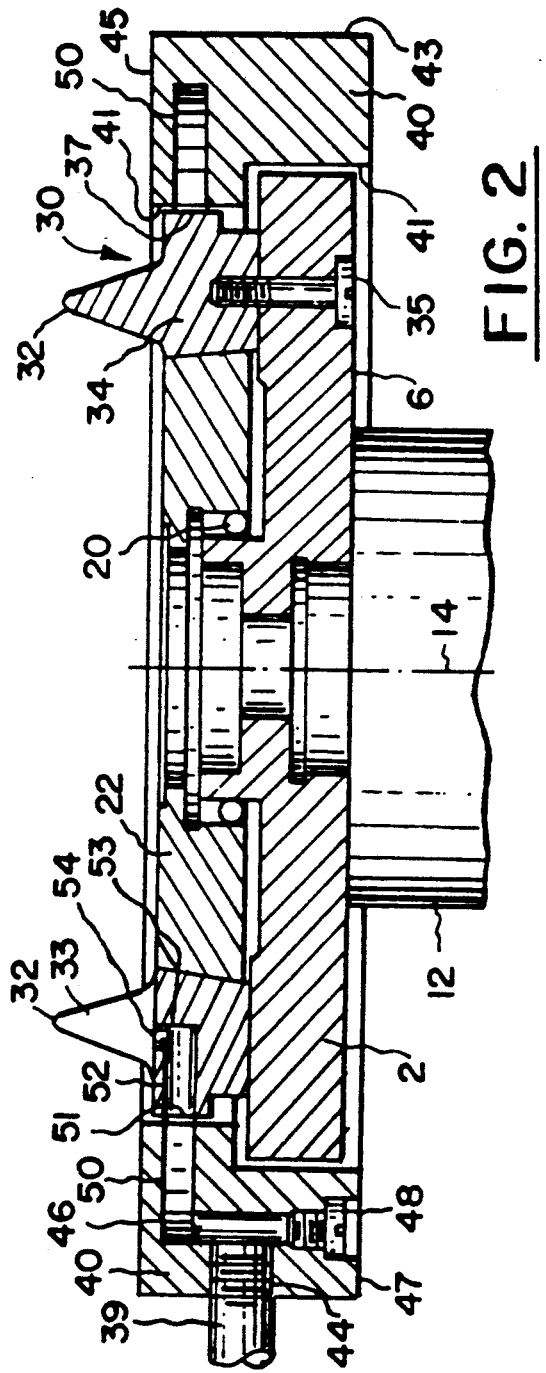

ROTARY RING CUTTER HAVING COOLANT DISTRIBUTION AND DISCHARGE MEANS

FIELD OF THE INVENTION

The present invention relates to face mill type cutters, especially rotary ring cutters, used in the production of gears, couplings, and the like. In particular, the present invention relates to rotary ring cutters having means to discharge coolant at the stock removing surfaces thereof.

BACKGROUND OF THE INVENTION

In metal working operations, coolant is commonly applied to the contact point or area of the tool and workpiece. The coolant prevents overheating by absorbing heat due to the working operation and also lubricates the contact area to reduce friction therefore reducing the amount of heat generated by frictional contact of the tool and workpiece. In stock removing processes, coolant further serves to flush metal chips away from the contact area.

In stock removing processes, a conventional tool utilized comprises a generally disc-shaped tool body with stock removing surfaces arranged thereon. The stock removing surfaces may be located about the periphery of the tool body as shown by U.S. Pat. Nos. 3,176,675 to Bomba or 3,777,443 to Shaw. Alternatively, the stock removing surfaces may project from one of the faces of the tool body as exemplified by WIPO Publication No. WO 92/06817 or U.S. Pat. No. 5,137,402 to Ball et al. This latter type of tool is generally referred to as a "face-mill" type tool.

Regardless of the arrangement of stock removing surfaces on the body of a tool, processes of removing stock material from workpieces usually necessitates coolant being delivered to the area of contact of the tool and workpiece for reasons such as those discussed above.

In tools having stock removing surfaces located about the periphery thereof, it is conventional to provide a reservoir means in the tool which is connected via unidirectional passages to the periphery of the tool. Upon rotation of the tool and introduction of coolant into the reservoir, centrifugal force causes the coolant in the reservoir to flow through the passages and exit at the periphery of the tool. Examples of this type of structure are shown in the aforementioned U.S. Pat. Nos. 3,176,675 and 3,777,443. In the production of gears and the like, gear type tools possessing this same type of reservoir and coolant passage structure are disclosed by U.S. Pat. No. 5,094,039 to Yoshioka and Japanese Patent Application No. 63-16921.

Another means for providing coolant to a rotating cutter having blades on the periphery thereof is disclosed by U.S. Pat. No. 4,414,783 to Vincent. In this arrangement, a coolant system is combined with a blade guard. Coolant channels are included in the blade guard and coolant is delivered over most of the cutter radius and on both sides of the cutter in order to contact the entire cutting area.

Of course, it can be seen that in tools having stock removing surfaces arranged on a face of the tool body, the reservoir and unidirectional passage arrangement applicable to those peripheral-type of tools discussed above will not provide coolant to the stock removing surfaces. Therefore, other approaches of providing coolant to a face of a tool body have been developed.

In tools having stock removing surfaces arranged on a face of the tool body it is known from U.S. Pat. No. 5,140,780 to Lincoln to substantially surround the entire tool with a housing. In the housing, coolant is directed against the tool to clean it while the rotation of the tool sprays the coolant against the workpiece.

In another arrangement, U.S. Pat. No. 4,528,779 to Wiener teaches grinding gears with the tool and workpiece immersed in a cooling lubricant bath to ensure coolant always being available at the grinding point. However, this procedure is very cumbersome and time consuming.

In grinding spiral bevel gears, passing a perforated grinding wheel through a feeder block comprising a sump containing grinding fluid is disclosed by U.S. Pat. No. 4,951,426 to Kurono et al. The rotating wheel passes through the feeder block and grinding fluid flows into the perforations in the grinding wheel. The grinding fluid is then carried to the workpiece. While this apparatus may be applicable to a grinding wheel, it does not lend itself to a plurality of cutting blades arranged about the face of a tool body.

In the tools where a plurality of stock removing surfaces, such as cutting blades, are arranged about the face of a tool body or head, it has been conventional to supply coolant to the contact area by spraying. An example of this is shown by the previously mentioned WO 92/06817 which discloses spraying coolant from the central attachment screw of a milling tool onto the stock removing surfaces of the tool. It is also well known to spray coolant onto a tool and workpiece via one or more externally arranged coolant hoses having their outlets located near the contact area.

In spraying, however, delivery of coolant originates from outside of the contact area and does not always adequately supply the tool and workpiece with sufficient coolant. There remains a need for supplying coolant directly to the point of contact of the tool and workpiece in tools having a plurality of stock removing surfaces arranged about the face of the tool body.

SUMMARY OF THE INVENTION

According to a first embodiment, the present invention comprises a coolant shroud arranged about at least a portion of the periphery of an annular face mill-type cutter, preferably a rotary ring cutter, having a plurality of stock removing surfaces arranged thereon. The coolant shroud is in the form of at least a portion of a circle and comprises opposing first and second side surfaces, an outside surface, and, an inside surface. The coolant shroud further includes a distribution chamber located inwardly of the outside surface with the distribution chamber being open to the inside surface and extending along at least a portion of the circular form of the shroud. The shroud includes one or more attachment means located in at least one of the first, second, and outside surfaces for attaching a coolant delivery means thereto with the attachment means communicating with the chamber.

The face mill type cutter comprises at least one inlet located on an outside surface thereof. The inlet is connected to a one or more outlet ports with the location of the outlet port or ports being at least one of (a) between at least a portion of the stock removing surfaces and (b) in the surface, preferably the cutting face, of at least a portion of the stock removing surfaces.

With the shroud arranged about the cutter, at least one inlet is adjacent the chamber and moves along the chamber opening during rotation of the cutter whereby coolant, introduced through the attachment means and into said chamber, flows into the inlets and exits at the respective outlet ports.

According to another embodiment, the present invention comprises a rotary ring cutter for machining gears, couplings, and the like. The cutter comprises a disc-shaped cutter head having an outer edge surface and first and second side surfaces and a cutter ring secured to the first side of the cutter head. The cutter ring comprises at least one stock removing surface integral with a circular base portion with the circular base portion having a base surface, a tapered inside ring surface and an outside ring surface.

The rotary ring cutter further comprises at least one inlet means located in the second side of the cutter head whereby coolant is introduced into said rotary ring cutter. Also included in the cutter is a substantially circular-extending coolant distribution chamber communicating with the inlet means, the coolant chamber being located within at least one of the cutter head and the cutter ring.

The rotary ring cutter further comprises at least one coolant passage extending from the coolant distribution chamber to one or more outlet ports. The location of the one or more outlet ports being at least one of (a) between at least a portion of the stock removing surfaces and (b) in an outer surface of at least a portion of the stock removing surfaces.

Alternatively, the coolant distribution chamber may communicate with one or more circularly arranged coolant grooves located in at least one of the cutter head and cutter ring base surface, with coolant channels extending from the coolant grooves to the outlet ports.

In another alternative arrangement, the coolant grooves may each communicate directly with a respective coolant supply means via a separate passage and inlet.

BRIEF DESCRIPTION OF THE DRAWINGS

FIG. 1 is a cross-sectional view of a rotary ring cutter.

FIG. 2 is a cross-sectional view of a first embodiment of the present invention wherein a shroud is arranged about the periphery of a rotary ring cutter.

DETAILED DESCRIPTION OF THE PREFERRED EMBODIMENTS

Figure 3:
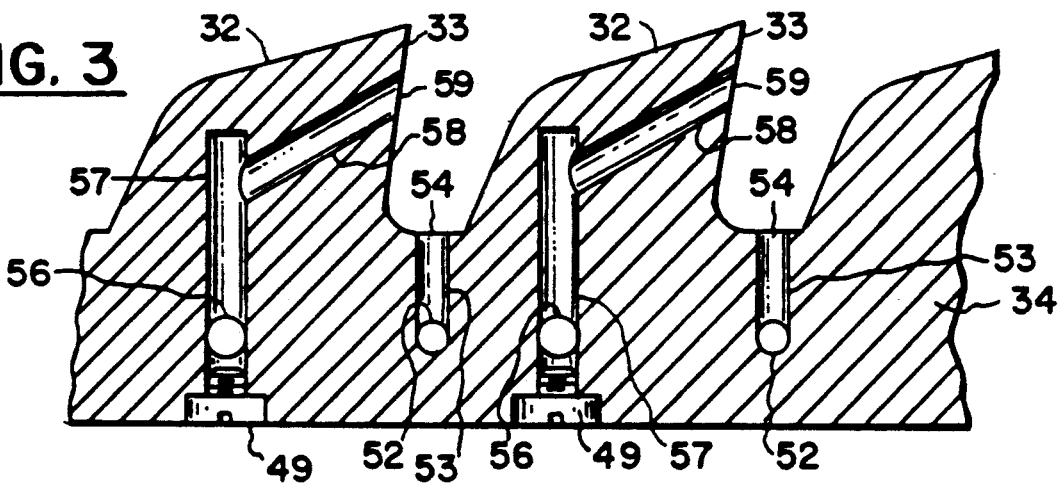
FIG. 3 illustrates coolant passages located within the cutter ring of a rotary ring cutter as shown by FIG. 2.

The preferred embodiments of the present invention will now be discussed with reference to the accompanying Drawings. It should be noted that in all figures of Drawings, like components are referred to by the same reference numbers.

FIG. 1 illustrates a rotary ring cutter similar to that shown in previously mentioned and commonly assigned U.S. Pat. No. 5,137,402 to Ball et al., the disclosure of which is hereby incorporated by reference. The cutter comprises a head 2 having a first side 4, an opposing second side 6, an outer edge surface 8, and an inner bore 10. The second side 6 and the inner bore 10 are positioned in contact with the mounting surfaces of a machine tool spindle 12 whereby the cutter may rotate about the axis of rotation 14 of the machine tool. The rotary ring cutter is secured to the machine spindle 12 by means such as a bolt (not shown) passing through a central opening 16 and into engagement with the spindle 12. Central opening 16 encircles axis 14.

The cutter head 2 further includes a projecting portion 17 encircling central opening 16. The projecting portion 17 includes an inner surface 18 and an outer surface 19 with at least the outer surface 19 being concentric with the axis 14. Extending about and in contact with the outer surface 19 is ball and cage arrangement 20 which is concentric with axis 14.

Attached adjacent to first side 4 is a disc-shaped centering disc 22 having at least a central opening and a circular recessed region comprising an inner recess wall surface 23. Centering disc 22 may be attached to cutter head 2 by means such as screws (not shown) or any other suitable means. The inner recess wall surface 23 is located about and in an interference fit with ball and cage arrangement 20 and is concentric with axis 14. The centering disc 22 further includes a tapered outer edge surface concentric with axis 14. The centering disc 22 together with the cutter head 2 forms a mounting assembly for a cutter ring 30.

Cutter ring 30 is arranged adjacent first side 4 and tapered outer surface 24 and comprises at least one stock removing surface 32, such as a cutting blade, having a face 33. The stock removing surfaces 32 are integral with a circular base portion 34 which includes a tapered inside ring surface 36, an outside ring surface 37, and a base surface 38. Inside ring surface 36 abuts and is complementary with tapered outer edge surface 24 such that placing cutter ring 30 on centering disc 22 results in the cutter ring 30 being centered on cutter head 2 concentrically about axis 14. Cutter ring. 30 is secured to cutter head 2 by any suitable means such as by a plurality of screws 35 (only one of which is shown) extending through cutter head 2 and into engagement with cutter ring base portion 34.

In machining processes using the rotary ring cutter, such as gear cutting or grinding, coolant is generally applied to the tool and workpiece by one or more hoses having their outlets located near the area of contact of the tool and workpiece. However, it is difficult for externally supplied coolant to reach the contact area where heat and friction are at a maximum.

FIG. 2 illustrates a preferred embodiment of the present wherein a coolant shroud 40 is arranged about the periphery of a rotary ring cutter. The shroud 40 is in the form of at least a portion of a circle and therefore extends at least partially about the circumference of the rotary ring cutter. The coolant shroud 40 comprises an inside surface 41, an outside surface 43, a first end surface 45, and a second end surface 47. The coolant shroud may be affixed to a machine tool by any suitable means such as bolting or mounting brackets.

Coolant shroud 40 further includes at least one attachment means 44, such as a threaded bore, for receiving a coolant supply 39, for example a hose or pipe having a threaded endpiece. Attachment means 44 is shown in outside surface 43 which is preferred, however, it may be placed at any location on the shroud 40 such as first end surface 45 or second end surface 47 and one or more attachment means 44 located in one or more of these surfaces may also be utilized.

Attachment means 44 is in communication with passage 46 which extends to a distribution chamber 50 located inwardly of outside surface 43. Chamber 50 has a length which extends along at least a portion of the form of shroud 40. Preferably, distribution chamber 50 has a generally rectangular cross-section and is circular in shape with the chamber being open along its length to first inside surface 41. Passage 46 is formed in the shroud by any suitable method, such as drilling, and a plug 48 is placed at the end of passage 46 to prevent coolant from escaping therefrom. Preferably, the cross-section of chamber 50 is oriented substantially perpendicular to first inside surface 41 or to axis 14 when placed about a cutter and passage 46 is oriented substantially parallel to first inside surface 41 or to axis 14 when placed about a cutter.

The cutter ring 30 includes a plurality of stock removing surfaces 32 such as cutting blades having faces 33. Between at least a portion of the stock removing surfaces 32 are outlet ports 54 which communicate with respective inlet ports 51 in the outer ring surface 37 via passages 52 and 53. Preferably, passage 52 extends substantially perpendicular to outside ring surface 37 or axis 14 while passage 53 extends substantially parallel to outside ring surface 37 or axis 14. FIG. 3 shows a cross-section of a series of blades on a cutter ring wherein outlet ports 54 are located between cutting blades 32. The passages 52 and 53 are usually formed by drilling.

While it is preferred that one or more outlet ports 54 discharge coolant, cutter ring 30 may contain outlet ports 59 which may also be seen in FIG. 3. Outlet ports 59 may be present either in lieu of or in addition to any number of outlet ports 54 and are positioned in the face 33 of at least a portion of the cutting blades 32. Outlet ports 59 communicate with the outer ring surface 37 via passages 56, 57, and 58. Preferably, passage 56 extends substantially perpendicular to the axis 14 in a manner similar to passage 52, passage 57 extends substantially parallel to axis 14, and passage 58 extends angularly from passage 58 toward outlet port 59 in a direction away from the base portion 34 of the cutter ring 30. Outlet ports 59 necessitate that the passage 57 be drilled from the base surface 38 of the cutter ring 34 and then the lower portion of the passage plugged by means 49 in a manner similar to plug means 48 in passage 46 of FIG. 2.

Figure 4:
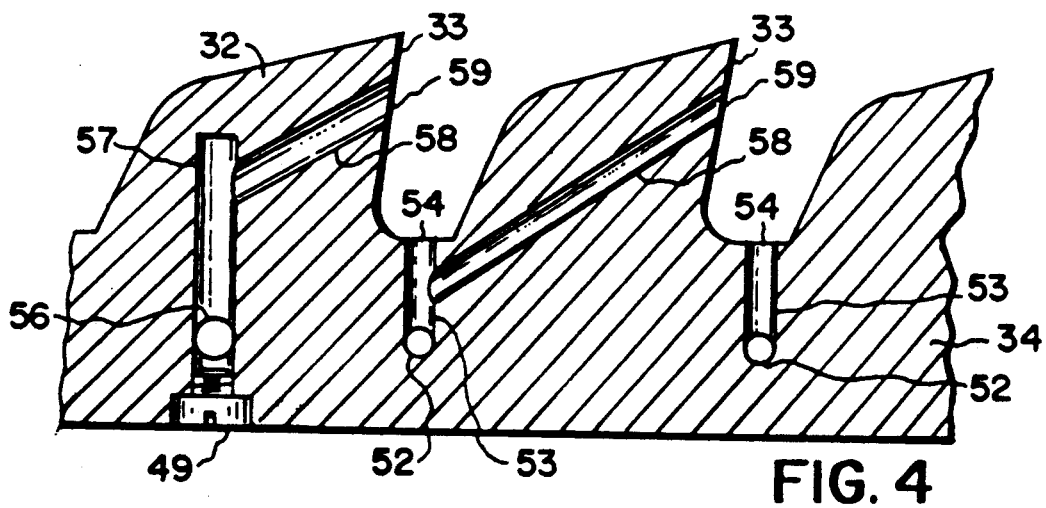
FIG. 4 illustrates an alternative arrangement of coolant passages located within the cutter ring of a rotary ring cutter as shown by FIG. 2.

FIG. 4 illustrates an alternative embodiment to the arrangement of FIG. 3. In this embodiment, an outlet port 54 and an outlet port 59 are both supplied by a single inlet 51 and passages 52 and 53. This is accomplished by extending passage 58 to communicate with passage 53, thereby eliminating the need for additional passages 56 and 57.

Figure 5:
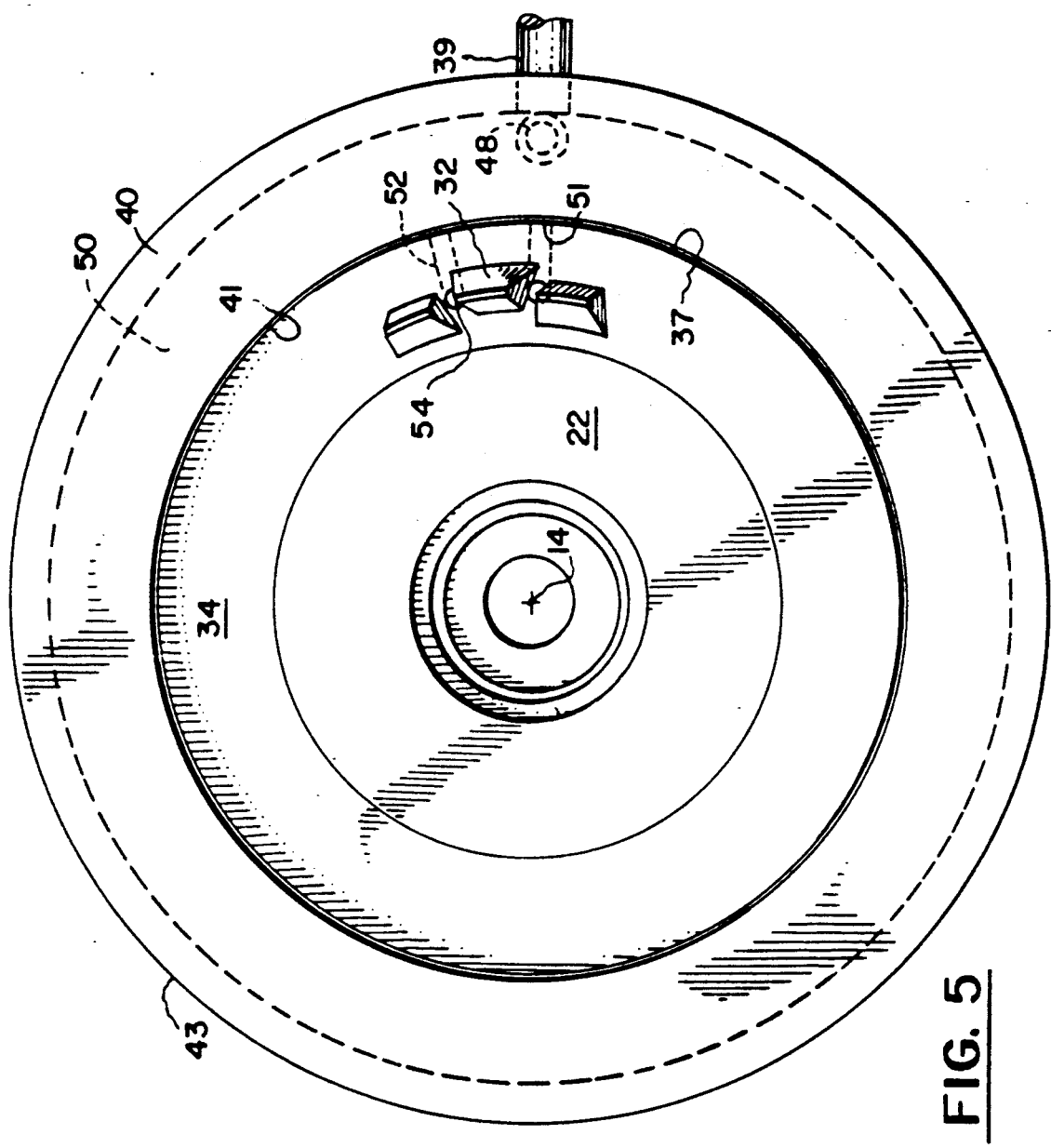
FIG. 5 illustrates a top view of a coolant shroud arranged about the periphery of a rotary ring cutter.

FIG. 5 shows a top view the preferred embodiment of the present invention comprising a coolant shroud 40 in place about the periphery of a rotary ring cutter. It is clearly seen that coolant shroud 40 and chamber 50 extend completely around the periphery of the rotary ring cutter. However, it is within the scope of the present invention for coolant chamber 50 to extend about only a portion of the periphery of the rotary ring cutter while coolant shroud 40 completely encircles the periphery of the rotary ring cutter.

Outlet ports 54 are located between cutting blades 32 of which three have been shown for illustrative purposes. It is to be understood that cutting blades 32 generally extend substantially completely around the cutter ring 30 and that outlet ports 54 are preferably located between at least a portion, and most preferably between substantially all of the cutting blades 32. Coolant channels 52 extend to inlet ports 51 located at outer ring surface 37, the inlet ports 51 being in registry with the coolant chamber 50 which is open along the inside surface 41 of the coolant shroud 40.

Figure 6:
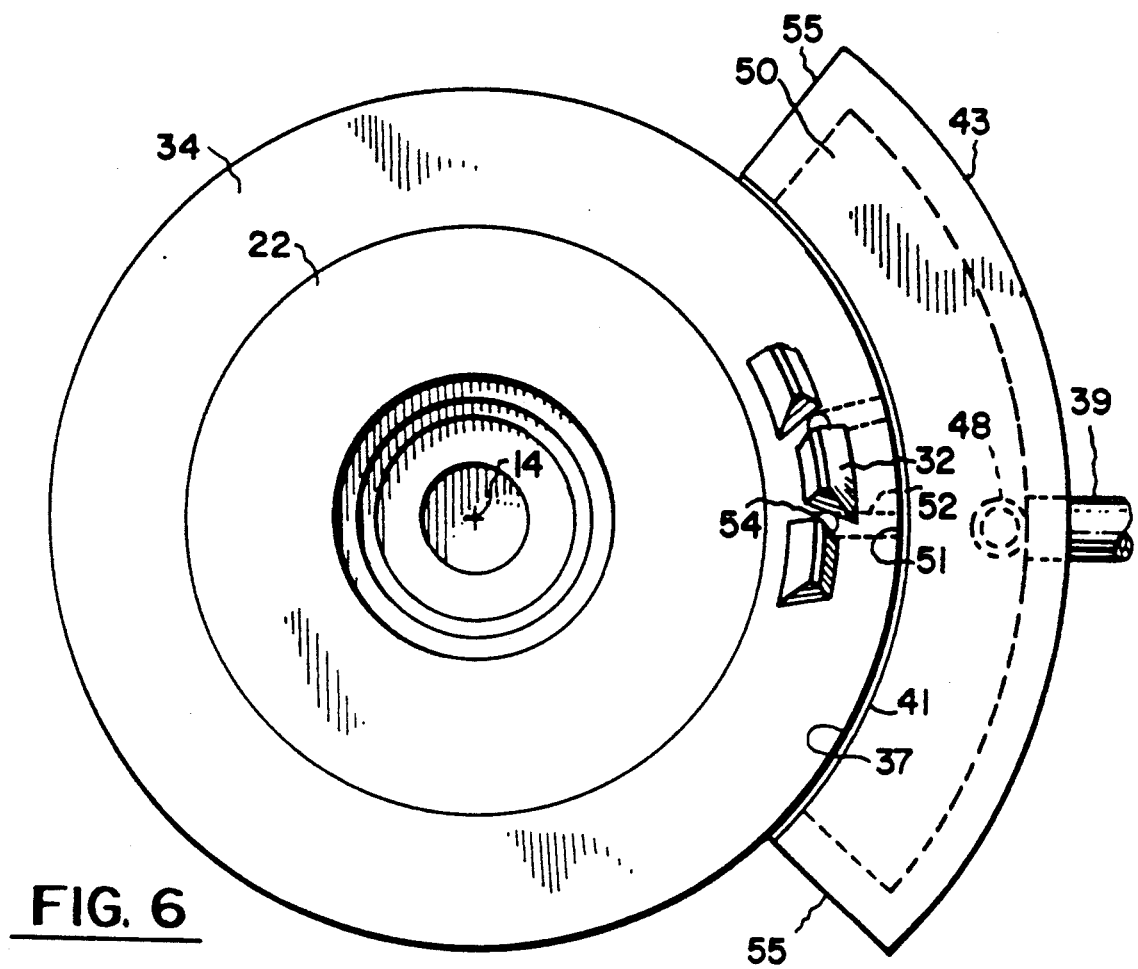
FIG. 6 is a top view of a coolant shroud arranged and extending about a portion of the periphery of a rotary ring cutter.

FIG. 6 represents an alternative coolant shroud arrangement wherein the coolant shroud extends along only a portion of the circular form of the rotary ring cutter. In this embodiment, the shroud includes end walls 55 and the coolant chamber 50 is located inwardly of the outside surface 43 and the endwalls 55 and is open at the inside surface 41. The shroud in FIG. 6 may be placed about a portion of the rotary ring cutter at the location where a workpiece is being cut.

Coolant supplied to coolant shroud 40 enters at attachment means 44 and flows through passage 46 into chamber 50. The coolant supplied is of sufficient pressure and volume to fill chamber 50 and force coolant into any number of inlet ports 51, through passages 52 and 53, and discharge the coolant at outlet ports 54. Of course, should outlet ports 59 be included in one or more faces 33 of cutting blades 32 of the rotary ring cutter, the chamber 50 would also supply coolant to passages 56, 57, and 58. In FIG. 5, as the cutter rotates about axis 14, inlet ports 51 stay in constant registry with the coolant chamber 50 and therefore a steady supply of coolant is always available to outlet ports 54. In FIG. 6, coolant is discharged only during that portion of cutter rotation when outlet ports 51 are in registry with coolant chamber 50.

Regardless of the circumferential extent of the shroud 40 or coolant chamber 50, coolant introduced according to the present invention reaches the contact area between tool and workpiece more efficiently than in prior art face mill type cutters since coolant discharges from within the contact area and is not sprayed from some external location as is the practice to date. Furthermore, coolant discharged from ports 54 and/or 59 greatly assist in the removal of metal chips by forcing the chips out and away from the contact area.

In the coolant shroud 40 of FIG. 2, it can be seen that the width of the cross-sectional portion defined by inside surface 41 and outside surface 43 is not uniform. The width of the coolant shroud 40 adjacent cutter ring 30 being greater than the width adjacent cutter head 2. This particular arrangement allows for the cross-sectional shape of the rotary ring cutter having a cutter head 2 of greater diameter that the cutter ring 30. However, it should be clearly understood that the coolant shroud of the present invention may have any cross-sectional shape which allows the shroud to accommodate the cross-sectional shape of the particular face mill type cutter which the shroud is arranged about.

When the coolant shroud 40 is placed about the periphery of a cutter ring 30 of the rotary ring cutter, a gap of about 0.005-0.010 inch (0.127-0.254 mm) exists between the inside surface 41 and the outside ring surface 37 of the rotary ring cutter. While some coolant inherently will escape through this small gap, the amount is minute and has no detrimental effect on the ability of the coolant shroud to provide sufficient coolant to the outlet ports of the rotary ring cutter. If desired, sealing means such as O-rings may be included between the inside surface 41 of the coolant shroud 40 and outside ring surface 37.

Figure 7:
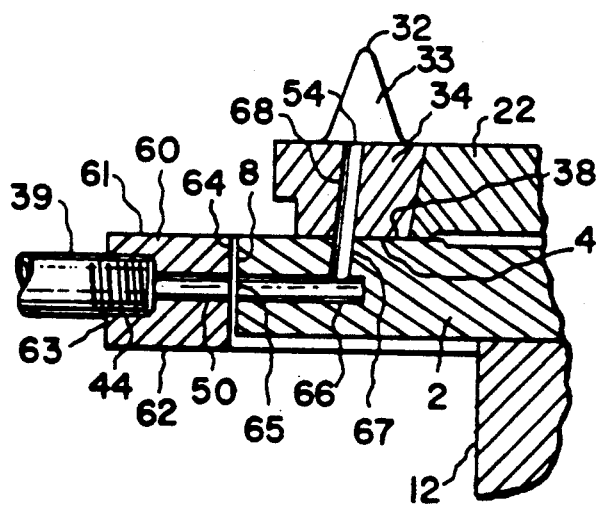
FIG. 7 illustrates an alternative coolant shroud arrangement wherein the shroud is arranged about the head of a rotary ring cutter.

FIG. 7 illustrates an alternative coolant shroud of the present invention. In this embodiment, a coolant shroud 60 is arranged about the outer edge surface 8 of cutter head 2 of a rotary ring cutter and communicates with outlet ports 54 or 59 via passages formed within the cutter head 2 and the cutter ring 34.

Coolant shroud 60 is of a generally rectangular or square cross-sectional shape and includes a first end surface 61, a second end surface 62, an outer surface 63, and an inner surface 64. One or more attachment means 44 are present for supplying coolant from a means 39 such as a hose or pipe. Attachment means 44 is connected directly to coolant chamber 50 which is open at inner surface 64. Coolant shroud 60 may be attached to a machine tool such as a gear cutting machine by any suitable means such as bolts or brackets.

Coolant chamber 50 registers with one or more inlet ports 65 located on the outer edge surface 8 of cutter head 2. Coolant flows from chamber 50 through inlet 65, passages 66 and 67 in cutter head 2, passage 68 in the cutter ring 34, and is discharged at outlet port 54. Each outlet 54 is connected to an inlet 65. Preferably passage 66 extends substantially perpendicular to axis 14 while passages 67 extends substantially parallel to axis 14. Passage 68 in cutter ring 34 extends substantially parallel to outside ring surface 37 or axis 14. If desired, sealing means such as O-rings may be included on either side of passages 67 or 68 at the interface of cutter head 2 and cutter ring base portion 34 to prevent any leakage of coolant therebetween.

Figure 8:
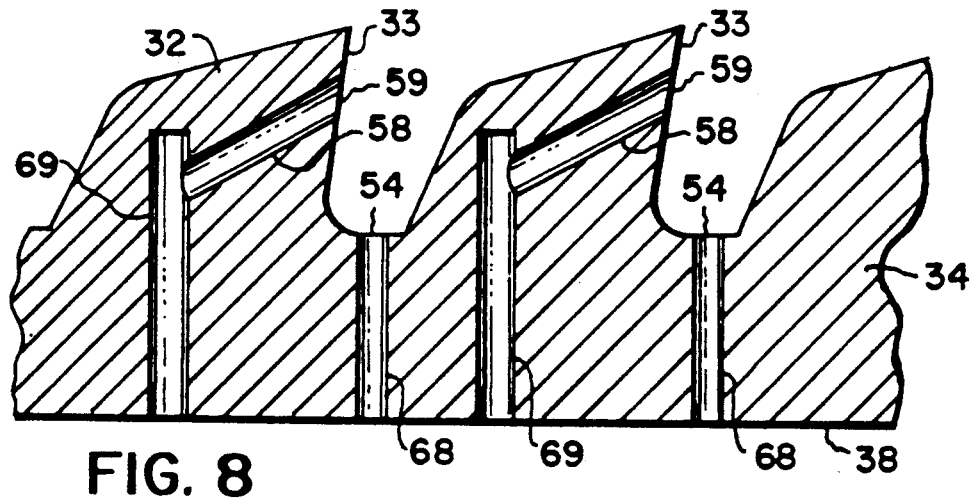
FIG. 8 illustrates an arrangement of coolant passages within a cutter ring as shown by FIG. 7.

FIG. 8 is a cross-sectional representation of a series of cutter blades 32 on cutter ring 34 in accordance with the coolant shroud configuration of FIG. 7. Passage 68 can be seen to extend from the base surface 38 of cutter ring base portion 34 to outlet port 54 located between cutting blades 32.

The cutter ring may include outlet ports 59 in lieu of or in addition to any number of outlet ports 54. The outlet ports 59 are arranged in the faces 33 of at least a portion of the cutting blades 32. Coolant shroud 60 communicates with the outlet ports 59 via inlet 65, passages 66 and 67 in cutter head 2 and passages 69 and 58 in cutter ring 34. Passage 69 extends generally parallel to axis 14 and is formed by drilling into the cutter ring 34 from the base surface 38.

In operation, coolant enters the chamber 50 through attachment means 44 from supply means 39. From chamber 50, coolant passes through inlet 65, passages 66 and 67 in cutter head 2, passage 68 in cutter ring 30, and is discharged through port 54. If outlet ports 59 are present, coolant flows through the same route on the cutter head 2 but enters passages 69 and 58 in cutter ring 30 and is discharged through outlet ports 59. As the cutter rotates, inlet ports 65 are in constant registry with the coolant chamber 50 and a steady supply of coolant is provided to the contact area of the tool and workpiece.

Figure 9:
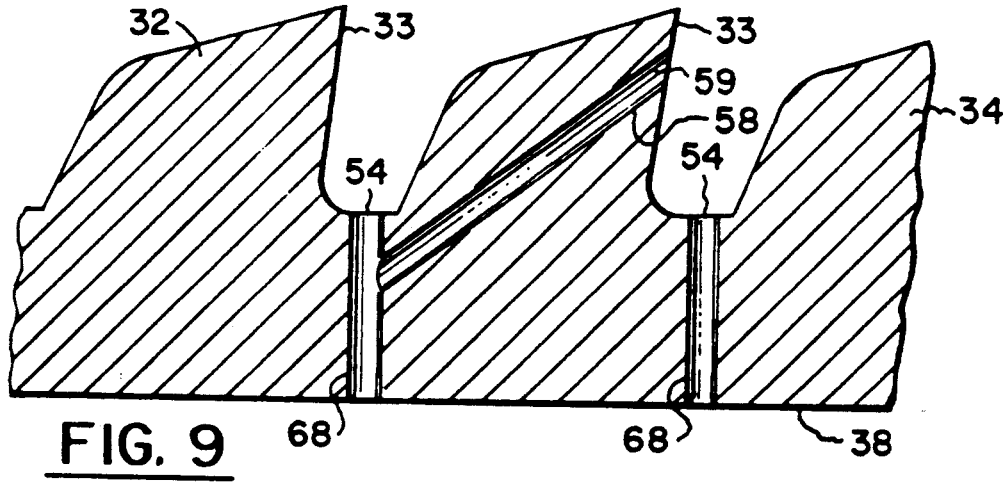
FIG. 9 represents alternative arrangement of coolant passages within a cutter ring as shown by FIG. 7.

While each outlet port 54 and 59 may be connected to its own respective inlet port 65, FIG. 9 illustrates an alternative coolant passage arrangement whereby an outlet port 54 and an outlet port 59 are supplied via a single inlet port 65. Passage 58 is extended to communicate with passage 68, resulting in the elimination of passage 69.

It should be understood that the coolant shroud 60 of FIG. 7 could easily be arranged about the outside ring surface 37 of cutter ring 34 in a manner similar to the coolant shroud 40 of FIG. 2. In that instance, a cutter ring 30 having coolant passages 52 and 53 and/or coolant passages 56, 57, and 58 as described above with reference to FIGS. 2, 3, and 4 would be utilized.

As with the coolant shroud 40 of FIG. 2, the coolant shroud 60 of FIG. 7 may extend completely about the periphery of a rotary ring cutter (See FIG. 5) or about only a portion thereof as demonstrated by previously discussed FIG. 6. In the latter instance, inlet ports 65 will be supplied with coolant during that portion of cutter rotation when the inlet ports 65 register with coolant chamber 50. Also, as with FIG. 2, a small gap will exist between inner surface 64 and outer edge surface 8. However, the amount of coolant discharged through this gap is minute. If desired, sealing means such as O-rings may be included between the inner surface 64 of the coolant shroud 60 and outer edge surface 8 of the cutter head 2.

While passages 53, 67, and 68 have been disclosed as being substantially parallel to axis 14, the orientation of some or all of these passages may be inclined to axis 14 as well.

Figure 10:
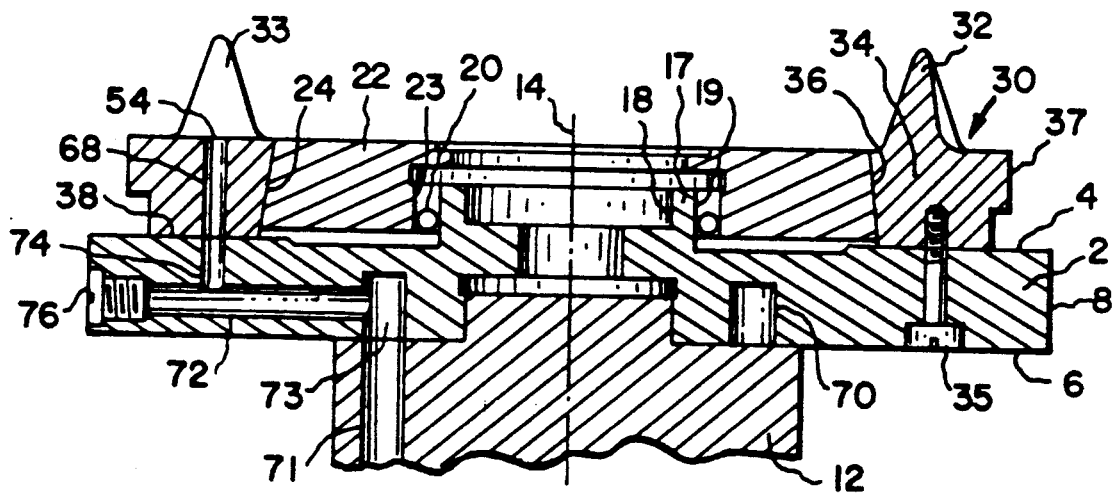
FIG. 10 illustrates a cross-sectional view of a second embodiment of the present invention wherein coolant is supplied to a rotary ring cutter through the spindle of a machine tool.

FIG. 10 illustrates another embodiment of the present invention wherein coolant is supplied to outlet ports 54 via an annular coolant distribution chamber 70 having an inlet 73 located adjacent second side surface 6 of cutter head 2. Coolant is provided to chamber 70 by at least one coolant supply means 71, such as a pipe, located within the spindle 12 of a machine tool, for example a gear cutting machine, and connected to the chamber 70 at the inlet 73. From chamber 70, a plurality of passages 72 extend radially outward toward outer edge surface 8 to passage 74 which extends substantially parallel to axis 14 and carries coolant to the first side surface 4 of cutter head 2 where passage 68 in cutter ring base 34 conveys the coolant to outlet port 54. It can be seen that the same cutter ring 30 utilized for the coolant shroud 60 in FIG. 7 may also be utilized for the arrangement of FIG. 10.

Figure 11:
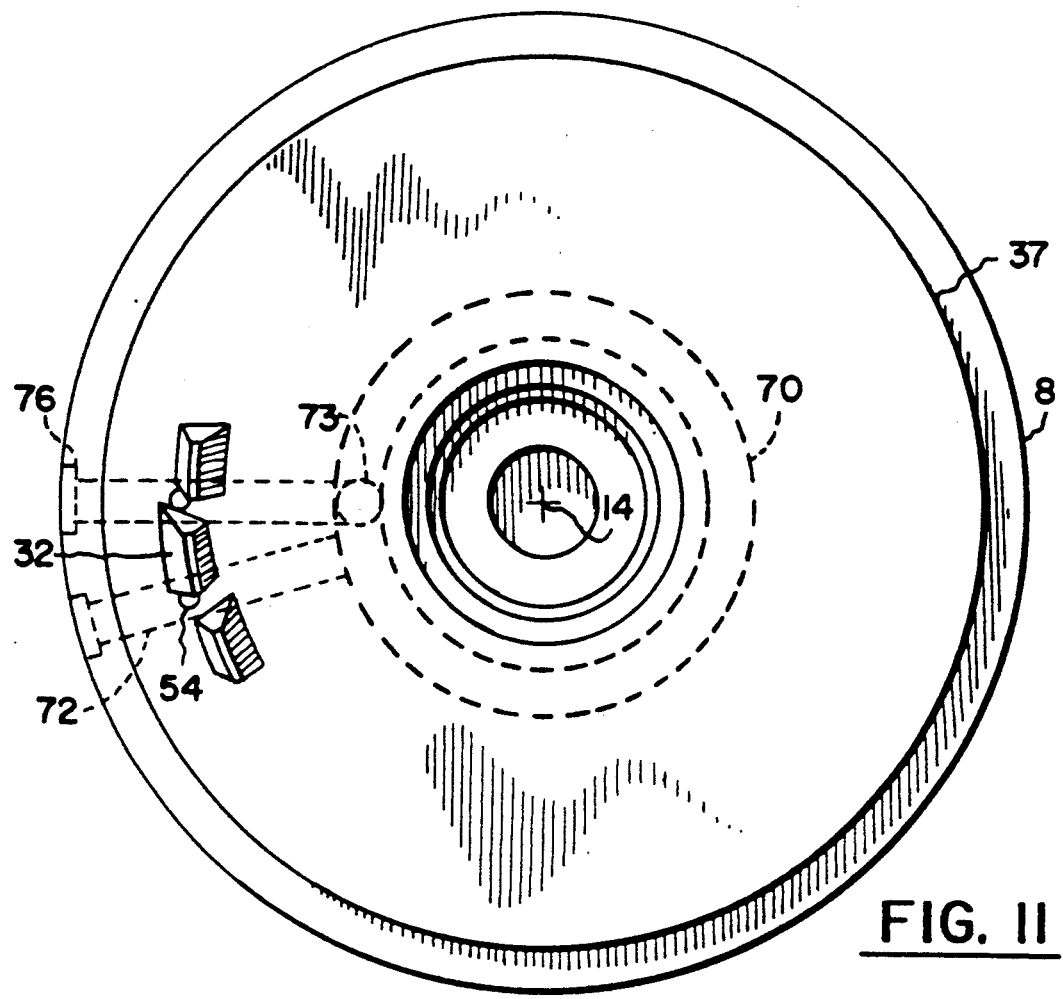
FIG. 11 is a top view of the rotary ring cutter shown in FIG. 10.

Each outlet port 54 has respective passages 72, 74, and 68 in order to communicate with coolant chamber 70. FIG. 11 shows a top view of the rotary ring cutter of FIG. 10. Coolant chamber 70 is preferably annularly arranged about axis 14 and individual coolant passages 72 extend from chamber 70 to carry coolant to respective outlet ports 54 between cutting blades 32 of which three are shown for illustrative purposes. In a manner similar to FIGS. 8 and 9, additional or alternative cooling passages 69 and 58 may be formed within cutter ring 30 to convey coolant to the face 33 of one or more cutting blades 32. In the case of the presence of coolant passage 69, passages 72 and 74 would be required to provide coolant to each passage 69 (see FIG. 8), whereas if passage 58 communicates with passage 68 (as in FIG. 9) there is no need for additional passages 72 and 74 beyond those required to convey coolant to passages 68.

Sealing means, such as O-rings, may be utilized on either side of passages 68 in base surface 38 or passages 74 in first side surface 4 to prevent coolant from escaping between the cutter ring 34 and the cutter head 2. Passage 72 is usually formed by drilling from outer edge surface 8 and therefore a plug means 76 is inserted at the outer edge surface 8 to prevent coolant flow therefrom.

Figure 12:
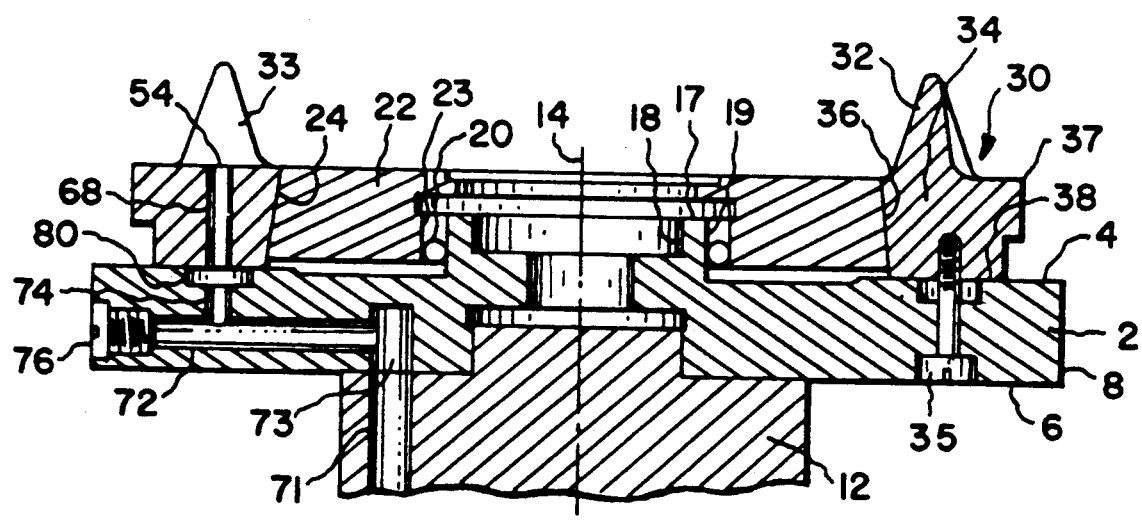
FIG. 12 is a cross-sectional view of a rotary ring cutter having a coolant chamber located in a face of the cutter head.

FIG. 12 illustrates a modification of the rotary ring cutter of FIG. 10 wherein annular coolant chamber 70 has been replaced with annular chamber 80 located at the first side surface 4 of cutter head 2. There is no change to the cutter ring 30 from that shown in FIG. 10. The coolant chamber 80 extends completely around the first side surface 4 and is of a width such that clearance is available for coolant to flow around any number of securing means, such as screw 35 for example, which may extend through the chamber 80 for the purpose of securing the cutter ring 30 to the cutter head 2.

Figure 13:
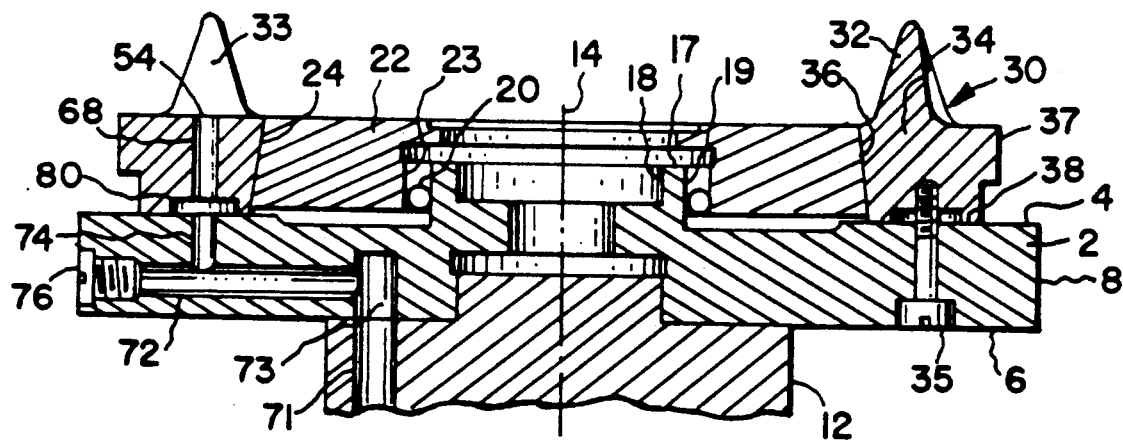
FIG. 13 represents a cross-sectional view of a rotary ring cutter having a coolant chamber located in the base surface of the cutter ring.
Figure 14:
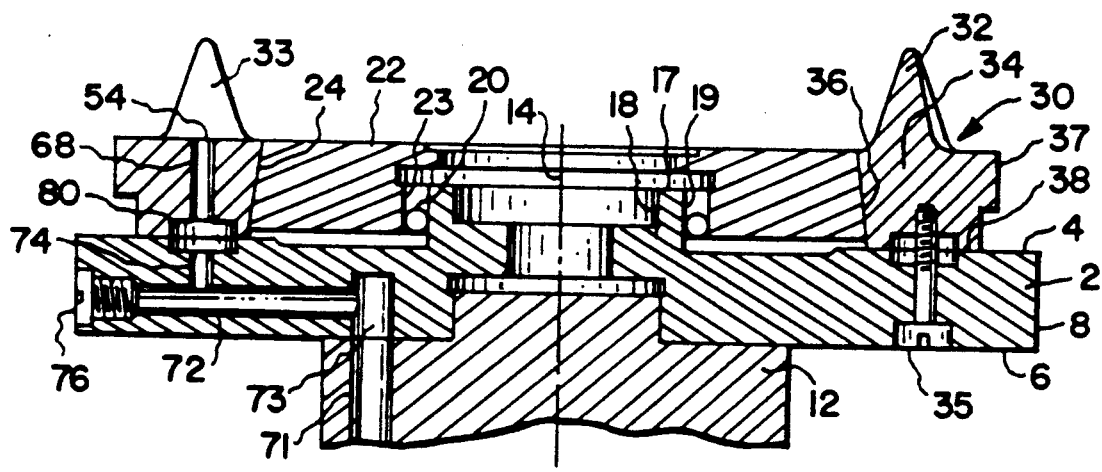
FIG. 14 represents a cross-sectional view of a rotary ring cutter having a coolant chamber formed from both the base surface of the cutter ring and a face of the cutter head.

FIGS. 13 and 14 illustrate modifications to the rotary ring cutter of FIG. 12. In FIG. 13, the coolant chamber 80 is located in the base portion 34 of cutter ring 30. The coolant chamber 80 extends continuously around and is open at the base surface 38 of cutter ring base portion 34. In FIG. 14, coolant chamber 80 is formed by circular portions removed from both the base portion 34 of cutter ring 30 and the first side surface 4 of cutter head 2.

As with the coolant channel of FIG. 12, the width of the coolant chamber 80 in FIGS. 13 and 14 is sufficient to provide adequate clearance for the flow of coolant around any means extending through the coolant chamber 80 such as screws 35 for securing the cutter ring 30 to the cutter head 2.

In any of the embodiments of FIGS. 12, 13, and 14, sealing means, such as O-rings, may be included on either or both sides of coolant chamber 80 at the interface between cutter head 2 and cutter ring 30 to prevent leakage of coolant therebetween.

Figure 15:
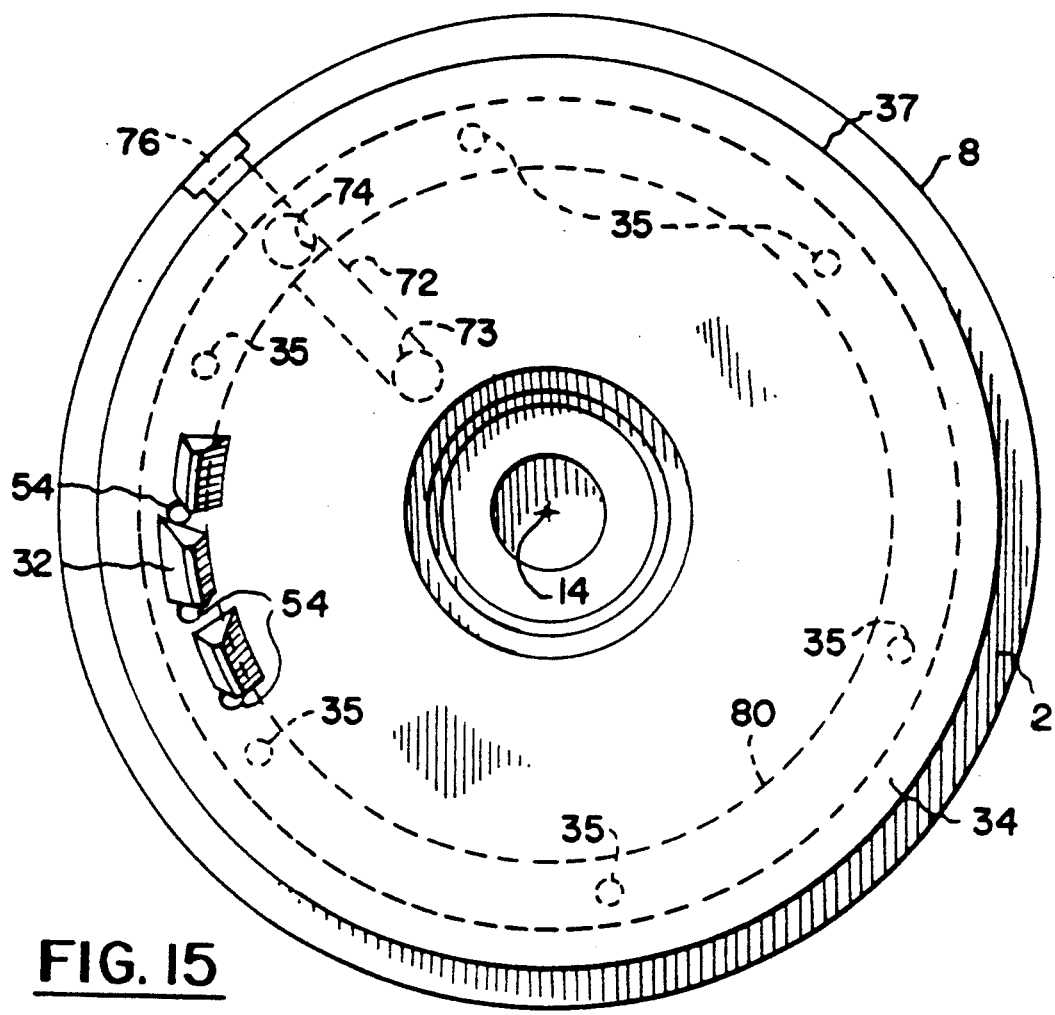
FIG. 15 is a top view of a rotary ring cutter as shown in FIGS. 12, 13, and 14.

FIG. 15 is a top view of a rotary ring cutter as represented by FIGS. 12, 13, or 14. In FIG. 15, three cutting blades 32 have been shown, the number of blades being selected for illustrative purposes only. The cutter ring 30 is secured to the cutter head 2 by six equidistantly spaced securing means 35, such as screws, which extend from the second side 6 of the cutter head into the base portion 34 of the cutter ring 30. See FIGS. 12, 13, or 14 for a cross-sectional view of screw 35. The coolant chamber 80, notwithstanding its location in the cutter head 2 (FIG. 12), the cutter ring base portion 34 (FIG. 13), or both (FIG. 14), must be sufficiently wide to allow the flow of coolant around screws 35.

Figure 16:
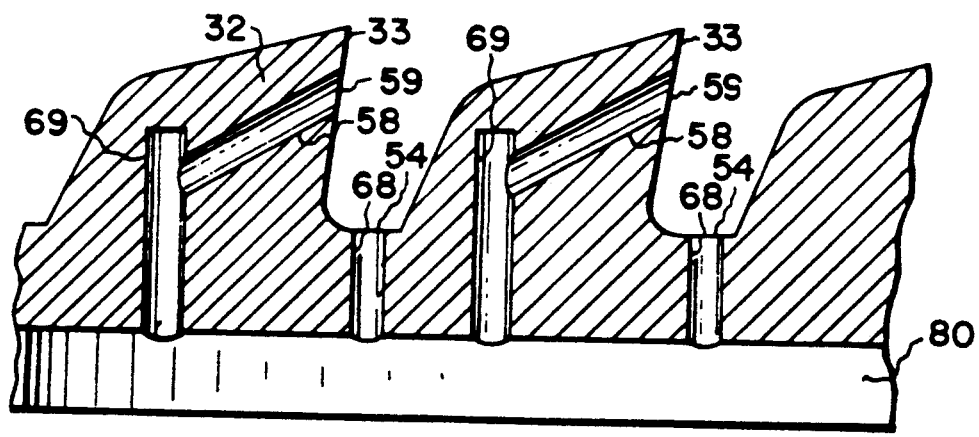
FIG. 16 illustrates a cross-sectional view of coolant passages arranged in a cutter ring and communicating with the coolant chamber of FIGS. 12, 13, and 14.

FIG. 16 shows a cross-sectional representation of a series of cutting blades 32 located above a portion of a coolant chamber 80. Passages 68 extend from the coolant chamber 80 to preferred outlet ports 54. In addition to, or, in lieu of outlet ports 54, outlet ports 59 may be positioned in the face 33 of one or more cutting blades 32. Outlet ports 59 may be connected to coolant groove 85 via passages 58 and 69, or, passages 58 may be extended to communicate with passage 68, as previously shown in FIGS. 4 or 9, thereby eliminating the need for passage 69.

Figure 17:
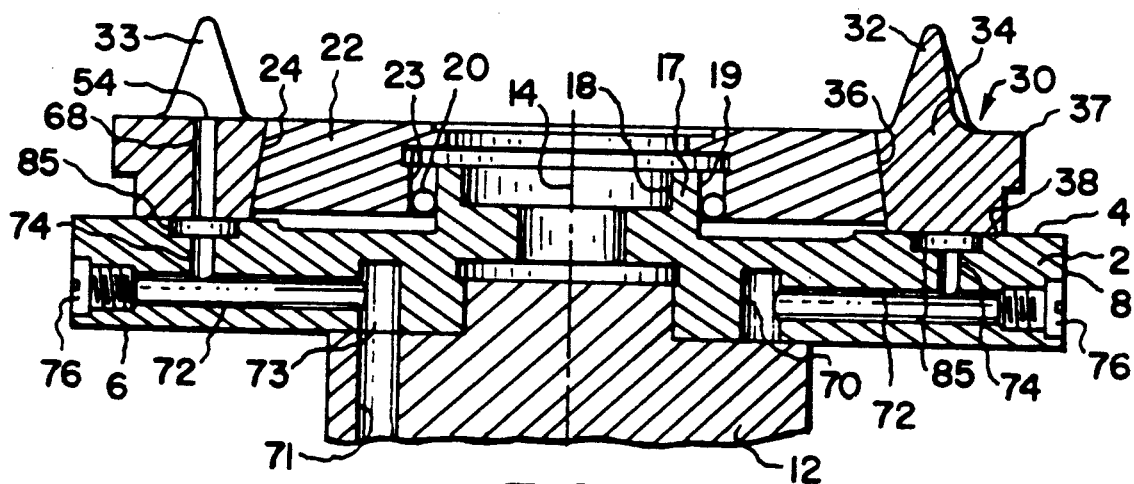
FIG. 17 illustrates a cross-sectional view of a rotary ring cutter having a series of individual coolant grooves located therein.
Figure 18:
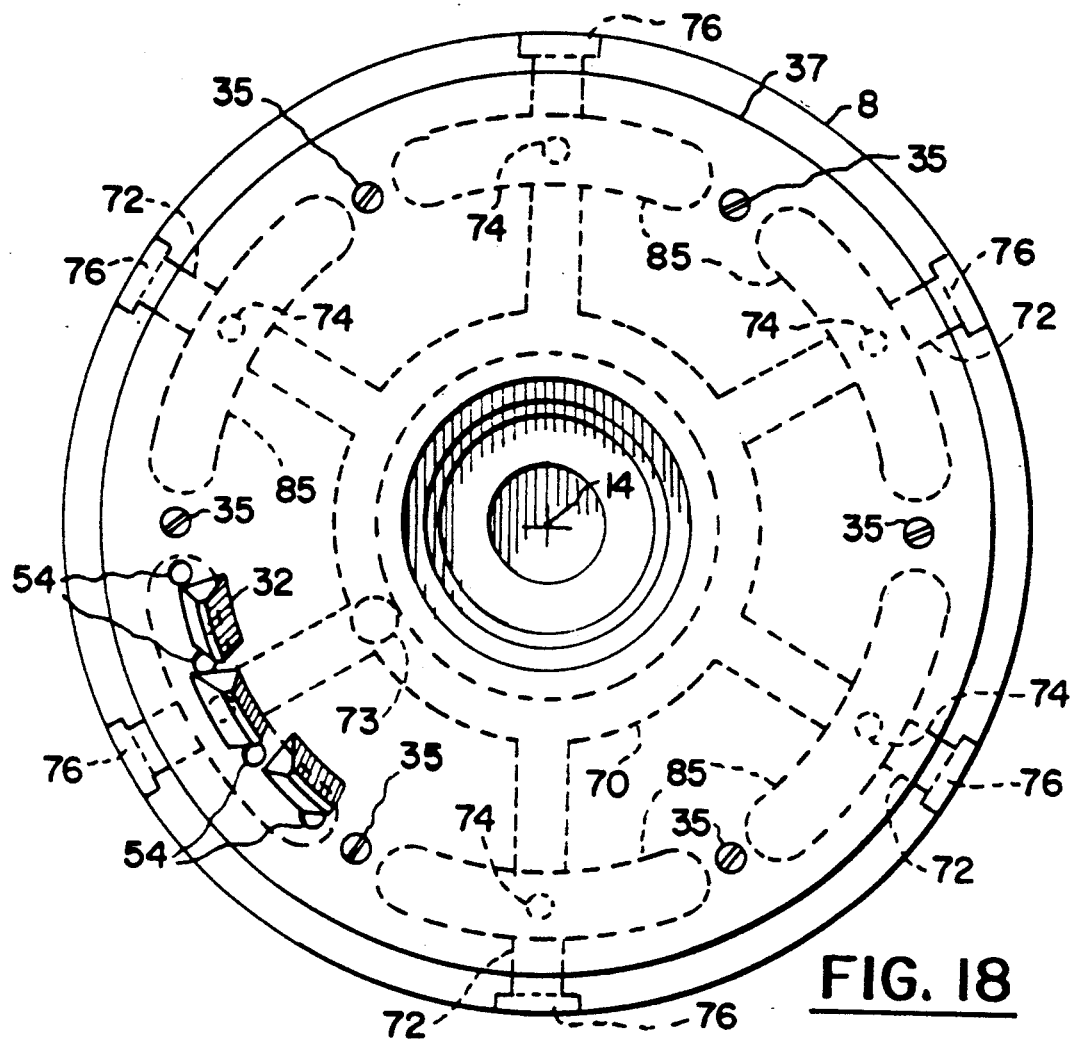
FIG. 18 is a top view of the rotary ring cutter shown in FIG. 17.

FIGS. 17 and 18 illustrate an additional embodiment of the present invention. In this embodiment, coolant chamber 70 is formed in the second side surface 6 of cutter head 2 as was previously shown in FIG. 10. From coolant chamber 70 are any number of radially extending coolant passages 72 which terminate with plug means 76 at the outer edge surface 8 of cutter head 2. Prior to plug means 76, axially extending coolant passages 74 convey coolant from each passage 72 to a respective coolant groove 85. Coolant grooves 85 are shown circularly arranged in the first side surface 4 of cutter head 2. However, it is to be understood that coolant grooves 85 may be arranged in the base surface 38 of cutter ring base portion 34 (similar to the coolant chamber 80 in FIG. 13) or the coolant grooves 85 may be formed from stock material removed from both first side surface 4 and base surface 38 (similar to the coolant chamber 80 in FIG. 14).

The formation of a number of coolant grooves 85 in the first side surface 4 of cutter head 2 eliminates the need to extend screws 35 through a coolant chamber 80 as is shown in FIG. 15. Attachment screws 35 pass between coolant grooves 85 as is seen in FIG. 18. With this arrangement there is no damage to screw threads due to the constant flow of coolant therearound as would be the case with the coolant chamber 80 of FIG. 15. Also, the coolant grooves 85 need not be as wide as the coolant chamber 80 since additional space to allow for coolant flow around screws 35 is not needed. This latter instance permits less stock material to be removed when forming coolant grooves 85 resulting in a time and labor savings as well as a more rigid rotary ring cutter.

Figure 19:
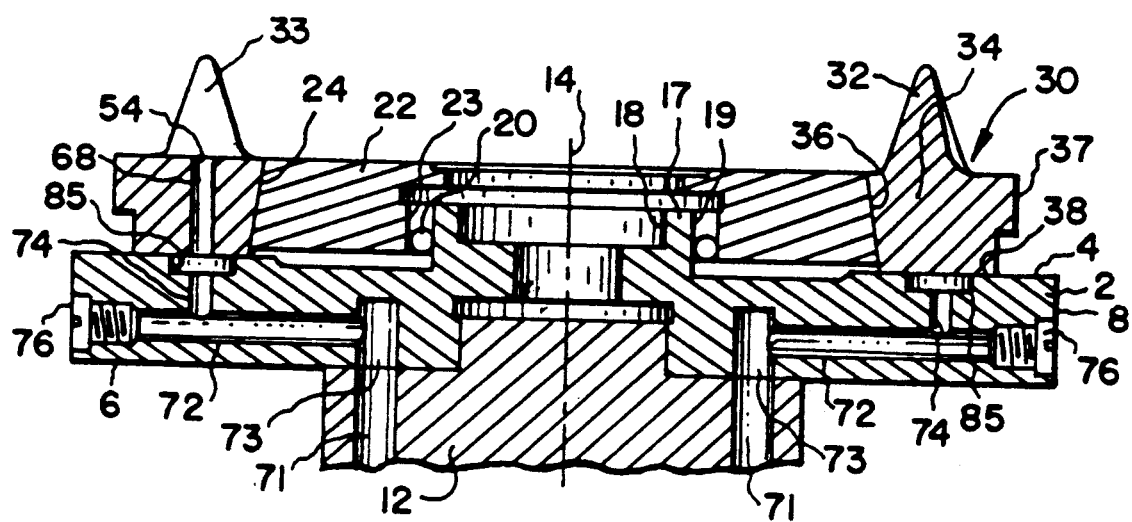
FIG. 19 illustrates an alternative to the embodiment of FIG. 17 wherein each coolant groove is connected directly to a separate coolant supply.
Figure 20:
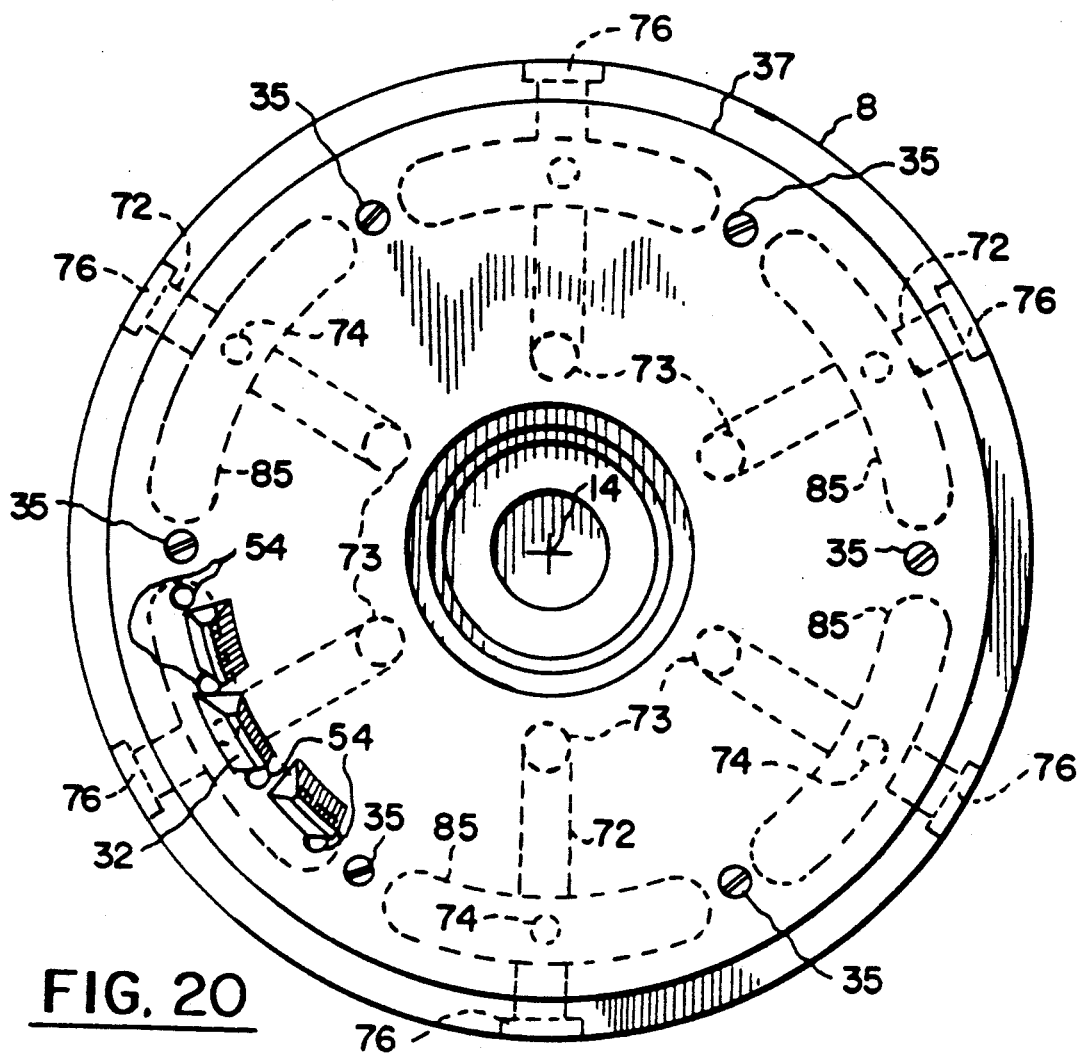
FIG. 20 is a top view of the rotary ring cutter shown in FIG. 19.

As an alternative to coolant chamber 70, FIGS. 19 and 20 show each coolant groove 85 connected directly, via respective passages 74 and 72 and inlet 73, to a separate coolant supply means 71, such as a pipe, extending through spindle 12 of a machine such as a gear cutting machine.

Figure 21:
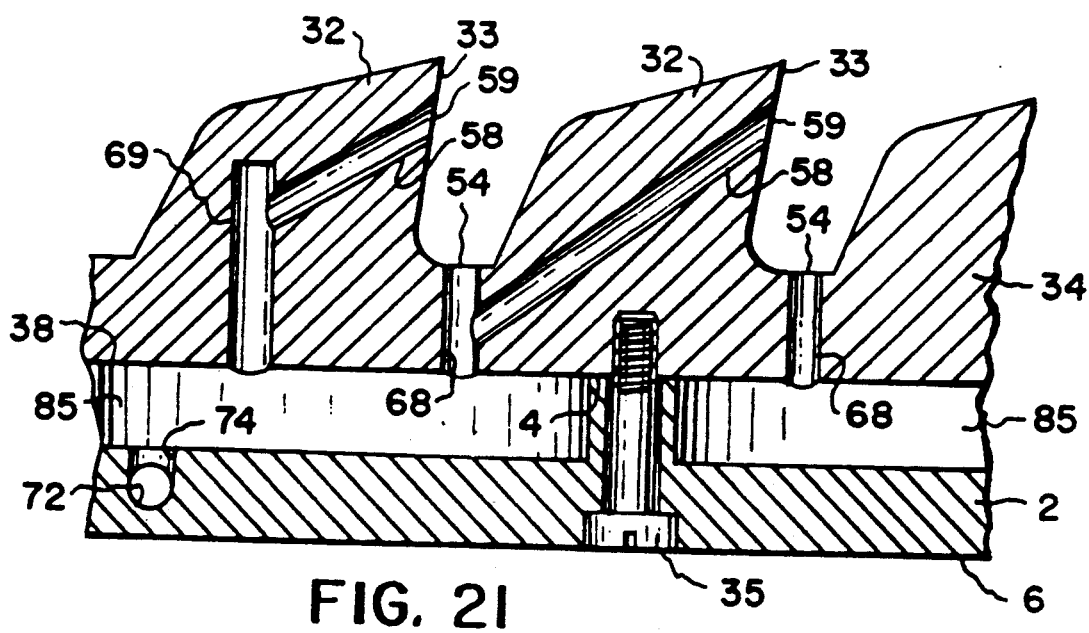
FIG. 21 illustrates a cross-sectional view of coolant passages communicating with the coolant grooves as shown in FIGS. 17–20.

FIG. 21 shows a cross-section of a series of cutting blades 32 located above successive coolant grooves 85 having an attachment screw 35 located therebetween. By locating screws 35 under a cutting blade 32, it is possible position coolant grooves 85 such that coolant is supplied to preferred outlet ports 54 between all cutting blades 32 if desired. Of course, outlet ports 59, of the type shown in FIGS. 8, 9, and 16 may be included with or utilized in lieu of outlet ports 54. Passages 58 to supply outlet ports 59 may communicate with coolant groove 85 via passage 69 or passage 68.

The present invention has been discussed with reference to rotary ring cutters, however, it should be understood that the inventive concepts discussed herein are also applicable to other types of face mill cutters.

Coolant passages of the present invention may be formed by any applicable process such as drilling. Coolant chambers and coolant grooves may be formed by any type of appropriate milling processes.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cutter ring for a rotary ring cutter, said cutter ring adapted to be centered on and secured to a cutter head whereby said cutter ring will rotate true about an axis of rotation during a machining operation, said cutter ring comprising:
   at least one cutting blade integral with a circular base portion, said circular base portion having a base surface, a tapered inside ring surface and an outside ring surface,
   at least one coolant passage extending from said base surface to one or more outlet ports, said one or more outlet ports being at least one of (a) between at least a portion of said at least one cutting blade and (b) in an outer surface of at least a portion of said at least one cutting blade.

2. The combination of a coolant shroud and cutter comprising a coolant shroud arranged about at least a portion of the periphery of an annular face mill-type cutter having a plurality of stock removing surfaces thereon, said coolant shroud being in the form of at least a portion of a circle and comprising:
   opposing first and second side surfaces,
   an outside surface,
   an inside surface,
   a chamber located inwardly of said outside surface, said chamber being open to said inside surface and extending along at least a portion of said form of said shroud,
   one or more attachment means located in at least one of said first, second and outside surfaces for attaching a coolant delivery means thereto, said attachment means communicating with said chamber,
   said cutter having at least one inlet on an outside surface thereof, said at least on inlet communicating with one or more outlet ports, the location of said one or more outlet ports being at least one of (a) between at least a portion of said stock removing surfaces and (b) in the surface of at least a portion of said stock removing surfaces,
   said at least one inlet being adjacent said chamber and moving along the chamber opening during rotation of said cutter whereby coolant introduced through said attachment means and into said chamber flows into said at least one inlet and exits at said respective outlet port.

3. The coolant shroud of claim 2 wherein the form of said shroud is circular.

4. The coolant shroud of claim 3 further comprising said chamber having a length extending along said circular form with said chamber being open to said inside surface entirely along said length.

5. A rotary ring cutter for machining gears, couplings, and the like, said rotary ring cutter being rotatable about an axis of rotation and having coolant passages therein, said cutter comprising:
   a disc-shaped cutter head having an outer edge surface and first and second side surfaces,
   a cutter ring secured to said cutter head and comprising at least one cutting blade integral with a circular base portion, said circular base portion having a base surface, a tapered inside ring surface and an outside ring surface,
   at least one coolant passage extending from at least one of (a) said outer edge surface of said cutter head and (b) said outside ring surface of said cutter ring to one or more outlet ports, said one or more outlet ports being at least one of (a) between at least a portion of said at least one cutting blade and (b) in the surface of at least a portion of said at least one cutting blade,
   whereby coolant is passed through said at least one coolant passage and exits at said respective outlet port.

6. The rotary ring cutter of claim 5 wherein said at least one coolant passage extends from said outer edge surface of said cutter head in a first direction substantially perpendicular to said axis and then in a second direction substantially parallel to said axis to said one or more outlet ports.

7. The rotary ring cutter of claim 5 wherein said at least one coolant passage extends from said outside ring surface of said cutter ring in a first direction substantially perpendicular to said axis and then in a second direction substantially parallel to said axis to said one or more outlet ports.

8. A rotary ring cutter for machining gears, couplings, and the like, said cutter being rotatable about an axis of rotation and comprising:
   a disc-shaped cutter head having an outer edge surface and first and second side surfaces,
   a cutter ring secured to said first side of said cutter head and comprising at least one cutting blade integral with a circular base portion, said circular base portion having a base surface, a tapered inside ring surface and an outside ring surface,
   inlet means located in said second side of said cutter head whereby coolant is introduced into said rotary ring cutter,
   a substantially circular-extending coolant chamber encircling said axis and communicating with said inlet means, said coolant chamber located within at least one of said cutter head and said cutter ring,
   at least one coolant passage extending from said coolant chamber to one or more outlet ports, said one or more outlet ports being at least one of (a) between at least a portion of said at least one cutting blade and (b) in an outer surface of at least a portion of said at least one cutting blade.

9. The rotary ring cutter of claim 8 wherein said coolant chamber is located adjacent said second side surface of said cutter head.

10. The rotary cutter of claim 9 wherein said at least one coolant passage extends from said coolant chamber radially in a first direction and then substantially parallel to said axis in a second direction to said one or more outlet ports.

11. The rotary ring cutter of claim 8 wherein said chamber is located adjacent to said first surface of said cutter head with at least one passage extending from said inlet to said chamber for providing a coolant flow path therebetween.

12. The rotary ring cutter of claim 11 wherein said at least one coolant passage extending from said chamber to said one or more outlet ports comprises at least one passage extending substantially parallel to said axis.

13. The rotary ring of claim 8 wherein said chamber is located adjacent said base surface of said cutter ring with at least one passage extending from said inlet to said chamber for providing a coolant flow path therebetween.

14. The rotary ring cutter of claim 13 wherein said at least one coolant passage extending from said chamber to said one or more outlet ports comprises at least one passage extending substantially parallel to said axis.

15. The rotary ring cutter of claim 8 wherein said chamber comprises a first portion formed in said first side surface of said cutter head and a second portion formed in said base surface of said cutter ring.

16. The rotary ring cutter of claim 15 wherein said at least one coolant passage extending from said first portion of said chamber to said one or more outlet ports comprises at least one passage extending substantially parallel to said axis.

17. A cutter ring for a rotary ring cutter, said cutter ring adapted to be centered on and secured to a cutter head whereby said cutter ring will rotate true about an axis of rotation during a machining operation, said cutter ring comprising:
 at least one cutting blade integral with a circular base portion, said circular base portion having a base surface, a tapered inside ring surface and an outside ring surface,
 at least one coolant passage extending from said outside ring surface to one or more outlet ports, said one or more outlet ports being at least one of (a) between at least a portion of said at least one cutting blade and (b) in an outer surface of at least a portion of said at least one cutting blade.

18. The cutter ring of claim 17 wherein said at least one coolant passage extends from said outside ring surface substantially perpendicular to said outside ring surface in a first direction and then substantially parallel to said outside ring surface in a second direction to said one or more outlet ports.

19. The cutter ring of claim 17 wherein said at least one coolant passage extends from said base surface in a direction substantially parallel to said outside ring surface to said one or more outlet ports.

20. The cutter ring of claim 17 further including a circular extending coolant chamber formed in said base surface with said at least one coolant passage extending from said chamber to said one or more outlet ports.

21. The cutter ring of claim 17 further including a circular extending series of grooves formed in said base surface with said at least one coolant passage extending from said series of grooves to said one or more outlet ports.

22. A coolant shroud in combination with a rotary ring cutter, said coolant shroud being positionable about at least a portion of the periphery of said rotary ring cutter, the combination comprising:
 said coolant shroud having:
 opposing first and second side surfaces,
 an outside surface,
 an inside surface,
 a chamber located inwardly of said outside surface, said chamber being open to said inside surface and extending along at least a portion of the form of said shroud,
 one or more attachment means located in at least one of said first, second, and outside surfaces for attaching a coolant delivery means thereto, said attachment means communicating with said chamber,
 said rotary ring cutter having:
 a disc-shaped cutter head having an outer edge surface and first and second side surfaces,
 a cutter ring secured to said cutter head and comprising at least one stock removing surface integral with a circular base portion, said circular base portion having a base surface, a tapered inside ring surface and an outside ring surface,
 at least one coolant passage extending from at least one of (a) said outer edge surface of said cutter head and (b) said outside ring surface of said cutter ring to one or more outlet ports, said one or more outlet ports being at least one of (a) between at least a portion of said stock removing surfaces and (b) in an outer surface of at least a portion of said stock removing surfaces.

23. The combination of claim 22 wherein said shroud is positionable about said outer edge surface of said cutter head wherein during rotation of said rotary ring cutter said at least one coolant passage extending from said outer edge surface is adjacent to and moves along said chamber.

24. The combination of claim 22 wherein said shroud is positionable about said outside ring surface of said cutter ring wherein during rotation of said rotary ring cutter said at least one coolant passage extending from said outside ring surface is adjacent to and moves along said chamber.

25. The combination of claim 22 wherein said shroud is positionable about the entire periphery of said rotary ring cutter.

26. The combination of claim 22 wherein said stock removing surfaces comprise cutting blades and said one or more outlet ports are arranged between at least a portion of said cutting blades.

27. A disc-shaped cutter head for a rotary ring cutter, said cutter head comprising:
 an outer edge surface and first and second side surfaces,
 said cutter head including at least a central opening encircling an axis of rotation,
 said first side including a projecting portion encircling said central opening, said projecting portion having an inner surface and an outer surface with at least said outer surface being concentric with said axis,
 coolant inlet means located in said second side of said cutter head,
 a substantially circular-extending coolant chamber communicating with said inlet means, said coolant chamber located at least partially within said cutter head.

28. The cutter head of claim 27 wherein said chamber is located adjacent said second side surface of said cutter head.

29. The cutter head of claim 27 wherein said chamber is located adjacent said first side surface of said cutter head.

30. A mounting assembly for a cutter ring, said mounting assembly and said cutter ring comprising, when assembled, a rotary cutter for cutting gears, couplings, shafts and the like, said mounting assembly comprising:
   a cutter head, said cutter head being disc-shaped and having an outer edge surface and first and second sides, said cutter head including at least a central opening through which an attachment means may pass for securing said rotary cutter to a cutting machine, said central opening encircling an axis of rotation, said first side including a projecting portion encircling said central opening, said projecting portion having an inner surface and an outer surface with at least said outer surface being concentric with said axis,
   a ball and cage arrangement extending about and in contact with said outer surface of said projecting portion, said arrangement being concentric with said axis,
   a disc-shaped centering disc having a tapered outer edge surface concentric with said axis, said centering disc attached to said cutter head and located adjacent said first side of said cutter head, said centering disc having at least a central opening, said centering disc having a circular recessed region comprising a circular inner recess wall surface with said circular inner recess wall surface located concentric with said axis and about and in an interference fit with said ball and cage arrangement whereby said centering disc is centered on said cutter head,
   coolant inlet means located in said second side of said cutter head,
   a substantially circular-extending coolant chamber communicating with said inlet means, said coolant chamber located at least partially within said cutter head.

31. The mounting assembly of claim 30 wherein said coolant chamber is located adjacent said second side surface of said cutter head.

32. The mounting assembly of claim 30 wherein said coolant chamber is located adjacent said first side surface of said cutter head.

33. A disc-shaped cutter head for a rotary ring cutter, said cutter head comprising:
   an outer edge surface and first and second side surfaces,
   said cutter head including at least a central opening encircling an axis of rotation,
   said first side including a projecting portion encircling said central opening, said projecting portion having an inner surface and an outer surface with at least said outer surface being concentric with said axis,
   at least one coolant inlet means located in said second side of said cutter head,
   a substantially circular-extending series of coolant grooves arranged in at least a portion of said first side surface, said series of grooves communicating with said inlet means.

34. The cutter head of claim 33 wherein said cutter head further comprises a generally circular coolant chamber arranged adjacent said second side surface and communicating with said inlet means, said coolant chamber also communicating with said series of grooves via at least one passage extending from said chamber to each groove of said series of coolant grooves.

35. The cutter head of claim 33 wherein each groove of said series of coolant grooves communicates with a separate inlet means.

36. A rotary ring cutter for machining gears, couplings, and the like, said cutter being rotatable about an axis of rotation and comprising:
   a disc-shaped cutter head having an outer edge surface and first and second side surfaces,
   a cutter ring secured to said first side of said cutter head by securing means and comprising at least one stock removing surface integral with a circular base portion, said circular base portion having a base surface, a tapered inside ring surface and an outside ring surface,
   at least one inlet means located in said second side of said cutter head whereby coolant is introduced into said rotary ring cutter,
   a substantially circular-extending series of coolant grooves formed in at least one of said first side surface and said base surface with said series of grooves communicating via passages with said at least one inlet means,
   at least one coolant passage extending from each of said coolant grooves to one or more outlet ports, said one or more outlet ports being at least one of (a) between at least a portion of said at least one stock removing surface and (b) in an outer surface of at least a portion of said at least one stock removing surface.

37. The rotary ring cutter of claim 36 wherein said cutter head further comprises a generally circular coolant chamber arranged adjacent said second side surface and communicating with said inlet means, said coolant chamber also communicating with said series of groove via at least one passage extending from said chamber to each groove of said series of coolant grooves.

38. The rotary ring cutter of claim 36 wherein each groove of said series of coolant grooves communicates with a separate inlet means.

39. The rotary ring cutter of claim 36 wherein said securing means comprises a generally circular arrangement of means extending from said second side surface of said cutter head through said first side surface and into engagement with said base portion of said cutter ring, said series of coolant grooves being arranged whereby said securing means pass between said grooves.

* * * * *